United States Patent
Kazmaier et al.

(10) Patent No.: US 10,929,501 B2
(45) Date of Patent: Feb. 23, 2021

(54) MANAGING AND QUERYING SPATIAL POINT DATA IN COLUMN STORES

(71) Applicants: Gerrit Simon Kazmaier, Heidelberg (DE); Tobias Mindnich, Walldorf (DE); Christoph Weyerhaeuser, Heidelberg (DE); Daniel Baeumges, Viersen (DE)

(72) Inventors: Gerrit Simon Kazmaier, Heidelberg (DE); Tobias Mindnich, Walldorf (DE); Christoph Weyerhaeuser, Heidelberg (DE); Daniel Baeumges, Viersen (DE)

(73) Assignee: SAP SE, Walldorf (DE)

( * ) Notice: Subject to any disclaimer, the term of this patent is extended or adjusted under 35 U.S.C. 154(b) by 1251 days.

(21) Appl. No.: 13/962,725

(22) Filed: Aug. 8, 2013

(65) Prior Publication Data

US 2015/0046411 A1 Feb. 12, 2015

(51) Int. Cl.
G06F 16/20 (2019.01)
G06F 17/10 (2006.01)
G06F 16/29 (2019.01)

(52) U.S. Cl.
CPC .............. G06F 17/10 (2013.01); G06F 16/29 (2019.01)

(58) Field of Classification Search
CPC ................................................. G06F 17/30864
See application file for complete search history.

(56) References Cited

U.S. PATENT DOCUMENTS

| | | | | |
|---|---|---|---|---|
| 5,426,780 | A * | 6/1995 | Gerull | G06F 17/30607 707/748 |
| 6,021,406 | A * | 2/2000 | Kuznetsov | G06F 17/30259 |
| 6,252,605 | B1 * | 6/2001 | Beesley | G01C 21/32 345/441 |
| 7,167,856 | B2 * | 1/2007 | Lawder | G06F 17/30333 |
| 8,055,687 | B2 * | 11/2011 | Zhang | G06F 17/30327 707/759 |
| 8,108,361 | B2 * | 1/2012 | Netz | G06F 17/30501 380/28 |
| 8,452,737 | B2 * | 5/2013 | Netz | G06F 17/30501 380/28 |
| 2003/0004938 | A1 * | 1/2003 | Lawder | G06F 17/30333 |
| 2003/0194116 | A1 * | 10/2003 | Wong | G06F 19/26 382/128 |
| 2004/0225638 | A1 * | 11/2004 | Geiselhart | G06F 17/3061 |

(Continued)

OTHER PUBLICATIONS

Lawder. "Calculation of Mappings Between One and n-dimensional Values Using the Hilbert Space-filling Curve." School of Computer Science and Information Systems. Birkbeck College. University of London. (Aug. 15, 2000). 13 pages.

(Continued)

*Primary Examiner* — Kristopher Andersen
(74) *Attorney, Agent, or Firm* — Mintz Levin Cohn Ferris Glovsky and Popeo, P.C.

(57) ABSTRACT

A query of spatial data is received by a database comprising a columnar data store storing data in a column-oriented structure. Thereafter, a spatial data set is mapped to physical storage in the database using a space-filling curve. The spatial data set is then compacted and such compacted data can be used to retrieve data from the database that is responsive to the query. Related apparatus, systems, techniques and articles are also described.

21 Claims, 9 Drawing Sheets

(56) References Cited

U.S. PATENT DOCUMENTS

| | | | | |
|---|---|---|---|---|
| 2010/0030796 | A1* | 2/2010 | Netz | G06F 17/30501 707/756 |
| 2010/0088309 | A1* | 4/2010 | Petculescu | G06F 17/3048 707/714 |
| 2010/0185692 | A1* | 7/2010 | Zhang | G06F 17/30333 707/803 |
| 2012/0109910 | A1* | 5/2012 | Netz | G06F 17/30501 707/693 |
| 2012/0166446 | A1* | 6/2012 | Bowman | G06F 17/30327 707/743 |
| 2012/0221528 | A1* | 8/2012 | Renkes | G06F 17/30315 707/674 |
| 2013/0121298 | A1* | 5/2013 | Rune | H04L 29/12066 370/329 |
| 2014/0082021 | A1* | 3/2014 | Hendrey | G06F 17/30495 707/772 |
| 2015/0046457 | A1* | 2/2015 | Weinstein | G06K 9/622 707/737 |

OTHER PUBLICATIONS

Lawder. "The Application of Space-filling Curves to the Storage and Retrieval of Multi-dimensional Data." Birkbeck College. University of London. (Dec. 1999). 221 pages.

Chung et al. "Efficient algorithms for coding Hilbert curve of arbitrary-sized image and application to window query." Information Sciences. Amsterdam, NL. vol. 177, No. 10. Mar. 8, 2007 (Mar. 8, 2007):2130-2151. XP005918371. ISSN: 0020-0255, DOI: 10.1016/J.INS.2006.12.003.

Owens, Alisdair W. "A Nine Month Progress Report on an Investigation into Mechanisms; for Improving Triple Store Performance." Oct. 2, 2007. XP055172547. Web. [retrieved on Feb. 27, 2015].

Van Oosterom, P.J.M. et al. "Spatial data management on a very large cadastral database." *Computers, Environment and Urban Systems*. vol. 25, No. 4-5. Jul. 2001 (Jul. 2001):509-528. XP055172564. ISSN: 0198-9715, DOI:10.1016/S0198-9715(00)00052-1.

Wei-Shinn, Ku et al. "Geo-Store: A Framework for Supporting Semantics-Enabled Location-Based Services." *IEEE Internet Computing*. IEEE Service Center. New York, NY. Institute of Electrical and Electronics Engineers. U.S. vol. 17, No. 2, Mar. 2013 (Mar. 2013):35-43. XP011498336. ISSN: 1089-7801. DOI:10.1109/MIC.2012.21.

Abadi et al. "Column-oriented Database Systems." ACM. VLDB 2(2) (2009):1664-1665.

Abadi et al. "Column-Stores vs. Row-Stores: How Different Are They Really?" ACM. SIGMOD Conference. (2008). 967-980.

Binnig et al. "Dictionary-based Order-preserving String Compression for Main Memory Column Stores." SIGMOD Conference. (2009):283-296.

Butz. "Alternative Algorithms for Hilbert's Space-Filling Curve." *IEEE Transactions on Computers*. (Apr. 1971):424-426.

Chen et al. "Neighbor-finding based on space-filling curves." Information Systems 30(2005):205-226.

Faloutsos et al. "Fractals for Secondary Key Retrieval". *Proceedings of the Eighth ACM SIGACT-SIGMOD-SIGART Symposium on Principles of Database Systems, PODS*. University of Maryland, College Park. (1989):247-252.

Farber et al. "The SAP Hana Database—An Architecture Overview". *Bulletin of the IEEE Computer Society Technical Committee on Data Engineering*. (2012):1-6.

Farber et al. "Sap HANA Database: Data Management for Modern Business Applications". *SIGMOD Record*. 40(4) (Dec. 2011):45-51.

Gaede et al. "Multidimensional Access Methods". *ACM Comput. Surv.* 30(2)(Jun. 1998):170-231.

Gomez et al. "A data model and query language for spatio-temporal decision support." *Geoinformatica*. 15(2011):455-496.

Idreos et al. "MonetDB: Two Decades of Research in Column-oriented Database Architectures." *IEEE Data Eng. Bull*. (2012):1-6.

IEEE Computer Society. *IEEE Data Engineering Bulletin. Special Issue on Column Store Systems*.35(1). Mar. 2012.

Jagadish. "Linear Clustering of Objects with Multiple Attributes." *SIGMOD '90*. AT&T Bell Laboratories. ACM (1990):332-342.

Lawder. "Querying Multi-dimensional Data Indexed Using the Hilbert Space-Filling Curve." *SIGMOD Record* 30(1)(2001):19-24.

Lemke et al. "Speeding Up Queries in Column Stores—A Case for Compression." T.B. Pedersen, M.K. Mohania, and A M. Tjoa (Eds.): DaWaK 2010. LNCS 6263. (2010):117-129.

Manolopoulos, Yannis et al. *R-Trees: Theory and Applications*. London:Springer-Verlag, 2006. Print. [Bibliographic data only].

Mokbel et al. "Analysis of Multi-Dimensional Space-Filling Curves." *GeoInformatica*, 7(3)(2003):179-209.

Mokbel et al. "Irregularity in high-dimensional space-filling curves." *Distrib Parallel Databases* 29(2011):217-238.

Sagan, Hans. *Space-filling Curves*. New York:Springer-Verlag, 1994. Print. [Bibliographic data only].

Samet, Hanan. *Foundations of Multidimensional and Metric Data Structure*. San Francisco: Morgan Kaufmann, 2006. Print. [Bibliographic data only].

Sikka et al. "Efficient Transaction Processing in SAP HANA Database: The End of a Column Store Myth." *SIGMOD '12 Conference*. (May 20-24, 2012):731-742.

Stonebraker et al. "C-Store: A Column-oriented DBMS." *Proceedings of the 31st VLDB Conference*. Norway. (2005):553-564.

Vermeij et al. "MonetDB, A Novel Spatial Column-Store DBMS." *Proceedings of FOSS4G '08*. South Africa. (2008):193-199.

Viswanathan et al. "OLAP Formulations for Supporting Complex Spatial Objects in Data Warehouses." A. Cuzzocrea and U. Dayal (Eds.): *DaWaK 2011, LNCS 6862*, (2011):39-50.

Viswanathan et al. "On the Requirements for User-Centric Spatial Data Warehousing and SOLAP." J. Xu et al. (Eds.): DASFAA Workshops 2011, LNCS 6637. (2011):144-155.

Willhalm et al. "SIMD-Scan: Ultra Fast in-Memory Table Scan using on-Chip Vector Processing Units." *VLDB '09*. Lyon, France. (Aug. 24-28, 2009):385-394.

Zukowski et al. "Vectorwise: Beyond Column Stores." *Bulletin of the IEEE Computer Society Technical Committee on Data Engineering*. (2012)1-6.

* cited by examiner

| | | | | | |
|---|---|---|---|---|---|
| 0 | ~ | 32766 | 27 | 4 | 42 |
| 1 | ~ | 114 | 5 | 31415 | 128~ |
| 2 | ~ | 27 | 4 | 42 | 3~ |
| 3 | | | ... | | |

MANAGING AND QUERYING SPATIAL POINT DATA IN COLUMN STORES

TECHNICAL FIELD

The subject matter described herein relates to the management and querying of spatial point data using space-filling curves.

BACKGROUND

Over the past couple of years, column-oriented data structures as a basis for column-stores have matured into a powerful component of today's enterprise applications. Column-stores can be found either as standalone systems, such as the SAP HANA platform. Column store based data management architectures have proven to be superior to traditional row-stores in terms of performance, in particular for OLAP-style analytical workloads that are common in data warehousing and business intelligence (BI) applications. One reason for this is the ability to efficiently process (compressed) column-oriented, in main memory data structures through hardware-optimized scans. Several recent developments have added to improvements in performance and functionality, such as transactional environments or compression techniques.

For traditional warehouse and BI applications, the primary focus in terms of information needs has been on sales data. Such data includes information about products, manufactures, suppliers, customers, sales and shipment transactions. While storage and query processing techniques have been highly optimized for analytical workloads operating on such data, the aspect that the majority of the data also have some geographic component has mostly been neglected. Although information about point-of-sales or customer records typically contain address information, characteristics of such data, including tailored functionality such as spatial and topological predicates, have received little attention. Still the most common approach is to geocode address information and to manage respective latitude and longitude information for addresses in extra fields. This approach is also applied in conventional column-oriented data management architectures in support of BI applications. With such arrangements, geographic coordinates corresponding to addresses are managed in standard columns that simply contain floating point numbers. That is, geographic data is not handled in a native way but managed and queried using techniques that are employed for traditional numeric and textual data.

An intuitive approach to add spatial features to column stores is to employ some of the proven spatial index structures that are used in relational database management systems (DBMS). Viable candidates for such an approach are R-Tree variants, K-d Trees, or Quadtrees, among many other (specialized) spatial index structures. However, these index structures are mainly targeted towards efficient access to secondary storage structures and therefore focus on block-optimized read and write operations. For column-organized data managed in an in-memory database, however, such tree-based index structures are not appropriate. There are several reasons for this limitation. First, column stores gain their performance through optimized scans of vector data that is not chunked into blocks. Second, tree-based index structures like the ones mentioned above incur overhead in space and time complexity because an index itself needs to be managed. In particular, nodes in these tree structures are linked in support of search and update procedures. Thus, they do not provide for continuous scans of in main-memory structures but require following link structures.

SUMMARY

In one aspect, a query of spatial data is received by a database comprising a columnar data store storing data in a column-oriented structure. Thereafter, a spatial data set is mapped to physical storage in the database using a space-filling curve. The spatial data set is then compacted and such compacted data can be used to retrieve data from the database that is responsive to the query.

The space-filling curve can be a Hilbert curve. Points in the spatial data set can be transformed into a positive coordinate space so that a quadrant can be defined on boundaries of the transformed points. A Hilbert order can then be determined for the quadrant. Such a Hilbert order can provide that each point in the spatial data set has a different Hilbert distance based on spatial proximity. The points in the spatial data set can be sorted according to their Hilbert distance. A data dictionary and a corresponding bit compressed vector for each axis of the spatial data set.

The spatial data set can be compressed so that no two points in the spatial data set have a same Hilbert distance. The spatial data set can be compressed so that there are no gaps between distances of points in the spatial data set.

The current subject matter can also utilize other types of space-filling curves including a Z-curve and/or a Moore curve.

Non-transitory computer program products (i.e., physically embodied computer program products) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the techniques described herein provide quicker responses to queries of spatial data.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides a framework for managing and querying spatial point data in column stores. The objective of this framework is to efficiently support typical OLAP-style query patterns that are common in (spatial) analytical workloads, sometimes referred to as geo-analytics, but can also be employed for ad-hoc OLTP-queries against large point datasets obtained through geocoding (e.g., point-of-service or address information). For illustration purposes, the current subject matter focuses on point data in 2- or 3-dimensional geographic space as building block for more complex spatial data, such as lines and polygonal regions. Similarly, the current subject matter targets query processing techniques towards point, region, and nearest neighbor queries in 2- or 3-dimensional geographic space. Especially region queries are common in geo-analytics workloads where users are interested in the number of customers or sales in a geographic region.

As will be described in further detail below, the current subject matter adapts space-filling curves to column stores. Being space-driven data structures, space-filling curves have the useful property to define a total order on the cells of some grid in 2D- or 3D-space. Through this, they aim to preserve proximity when, e.g., point data is mapped to physical storage. One example of a space-filling curve is a Hilbert-curve. Other types of space-filling curves can be utilized including, for example, Z-curve, Moore-curve, and the like. The Hilbert-curve, is advantageous in some implementations because they can also provide for many options for optimizations, including compressions and fast SIMD-based (single instruction multiple data) scans, which are essential for processing queries over column stores. While the following will be mainly directed to Hilbert-curves, the current subject matter can be applied to other space-filling curves (unless otherwise explicitly stated).

Although the current techniques for mapping and querying point data in column stores are generic and can be applied to any type of (dictionary encoded) column store infrastructure, as a proof-of-concept, the inventors developed and evaluated the framework in the context of the SAP HANA platform. In addition, the techniques described herein can efficiently store batches of point data in a column store using a so-called Hilbert distance these points have with respect to a given Hilbert-curve. The point data can then be ordered in columns based on this Hilbert distance, thus allowing for lightweight compression techniques. Based on the above representation of point data in a column store, query processing techniques can be presented that efficiently evaluate point, region, and nearest neighbor queries. Such queries can be seaminglessly integrated into the SAP HANA front-end using standard language features for spatial data types and methods.

In column-stores, in main memory, vectors of values are continuous and are typically not viewed in a block-oriented fashion. Therefore, it is desirable to map spatial (point) data specified in 2- or 3-dimensional space based on some total order that preserves spatial proximity of the objects when physically stored. Space-filling curves have such a property. The current subject uses space-filling curves, such as Hilbert-curves, for mapping spatial point objects to column stores adopts and for tailoring techniques for mapping n-dimensional values or neighbor-finding to the specifics of column stores.

Although the current mapping strategies can be seamlessly integrated into any column store system, below is some information about the SAP HANA infrastructure with respect to the overall architecture, update handling, dictionary coding principles, and memory scan optimizations.

Figure 1:
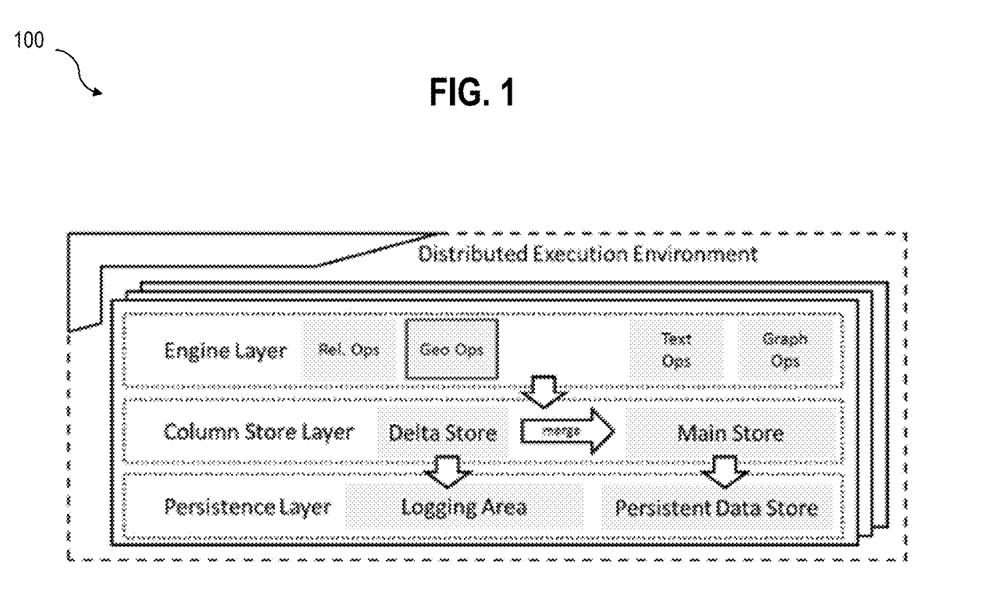
FIG. 1 is a diagram illustrating a database environment including a column store.

The SAP HANA database itself follows a strict layered architecture. Similar to classical systems, the SAP HANA database distinguishes between compile time and run time of a database request. Multiple components like transaction manger, authorization manager, meta data (replication) manager, session management are clustered around a distributed data flow execution environment. Within this environment, different sets of plan operators provide the abstraction from the column-oriented storage model to the corresponding data model. The engine currently supports a wide range of different set of operators ranging from relational operators (for the core SQL data model) to text or graph processing operators (for more elaborated and partially domain and SAP-specific data models). The general architectural design decouples the access primitives of the storage system from the different model-specific views on the data. The set of geo operators providing the functionality of geo-aware methods on top of geo-agnostic data structures complements this set of plan operators (as shown in diagram 100 of FIG. 1) and automatically takes advantage of all functional and non-functional characteristics of the column store layer, for example:

Transactional Behavior:

The column store layer provides a transactionally consistent view to the engine layer following the MVCC principle. All operations of a query on top of this layer are transparently embedded into a sphere of control with access only to the correct underlying version of data.

Update Processing:

Comparable to all column-store systems, the SAP HANA database also consists of a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. For the scope of the paper, we want to emphasize that all modifications coming from the user or directly within the system are encapsulated within the column store layer and transparent for the engine layer.

Figure 2:
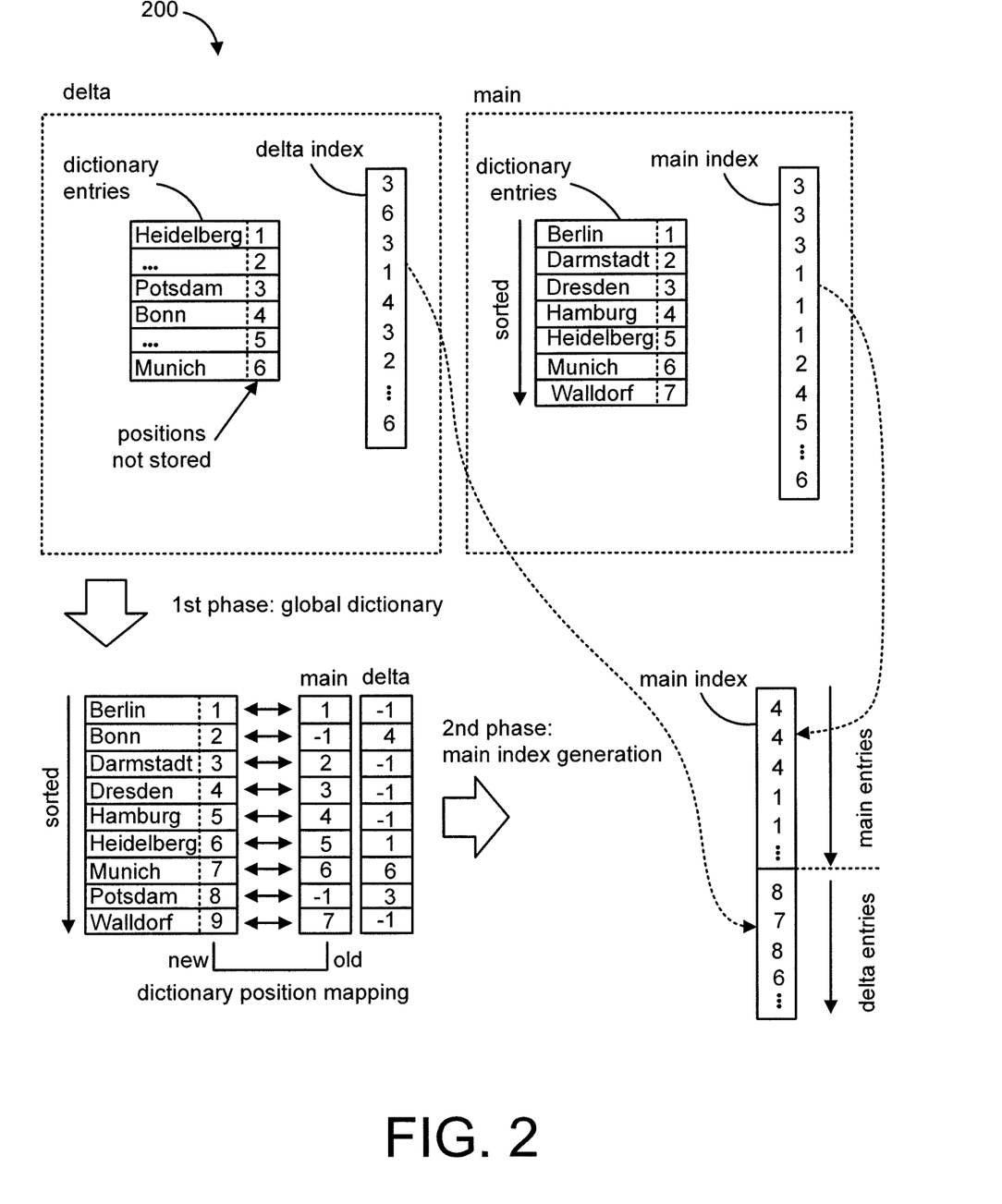
FIG. 2 is a diagram illustrating data dictionaries and a corresponding bit compressed vector.
Figure 3:
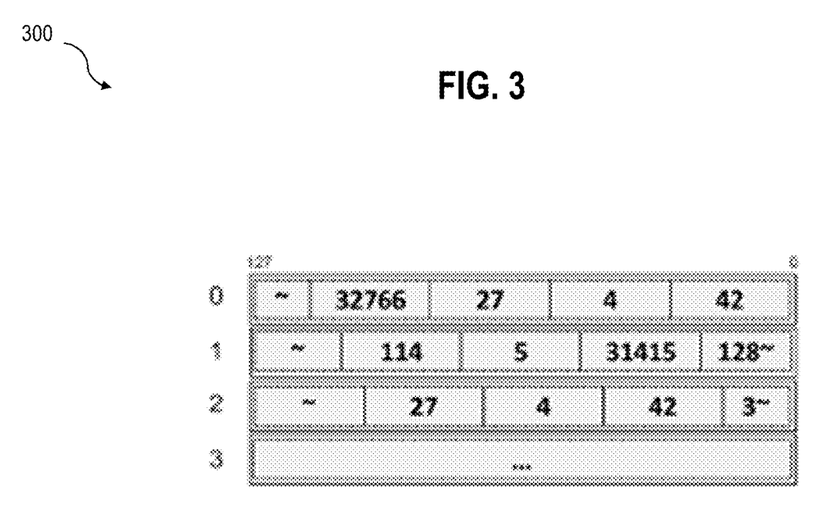
FIG. 3 is a diagram illustrating a storage layout of a vector.

Dictionary Encoding:

The column store engine applies dictionary encoding to all columns, independent of their cardinality of number of distinct values. As shown in diagram 200 of FIG. 2, a column then results in two data structures: on the one hand the dictionary, mapping the user-values to Value IDs. On the other hand the bit compressed vector with Value IDs representing the columns of the original table. Due to frequent modifications and its temporary characteristics, the dictionary of the delta is unsorted. The dictionary of the read-optimized main, however, is sorted with respect to the user values. A merge then basically consists of two steps. In a first phase, a new dictionary is constructed, consolidating the entries of the main and delta dictionaries and generating new Value IDs. In a second step, the main bit compressed vectors are recreated by physically generating a new image of the bit compressed vector consisting of the old entries (ignoring deletes) and new entries of the delta. Obviously many highly optimized versions of the process exist to speed up the merge process for specific scenarios. Again, the layer above does not notice such internal and asynchronous reorganization steps. To summarize, the SAP HANA database design provides a basis for a seamless integration of data-model specific operators relying on core column store data structures. All updates, reorganizations, efficient scan implementations etc. are completely transparent for the engine layer and can be exploited via well-defined scan methods. This arrangement allows for easy adopting the techniques and transfer into other columnar systems.

As stated above, space-filling curves can be used to map point data to a column-store. Naive approaches to map a point set to a column-store result in poor query performance as there is a lack of memory locality. That is, points that are close to each other in space can be mapped to any position in an bit compressed vector, thus often requiring a full scan for evaluating a spatial predicate and consequently not exploiting the scan-centric paradigm of platforms such as the SAP HANA platform.

A natural "linearization" of point data is a space-filling curve, such as a Hilbert curve. A Hilbert curve of order d, d≥1, is a one-dimensional continuous curve in a N×N grid with $N=2^d$ such that the curve visits every cell located in the grid space exactly once. As illustrated in diagram 400 of FIG. 4, a Hilbert curve is constructed in a recursive fashion, based on a (rotating) ⊓ shape.

Figure 4:
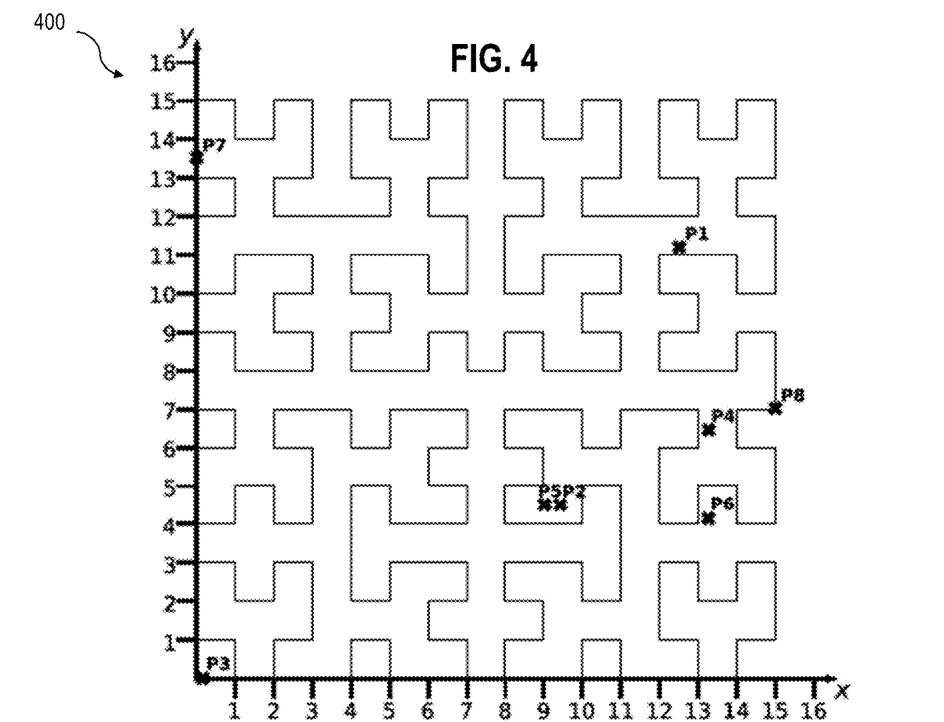
FIG. 4 is a first diagram illustrating spatial data in relation to a space-filling curve.

For a Hilbert curve of order 1, a square is simply divided into four equal size sub-squares containing that ⊓ shape curve. The numbers along the curve specify an enumeration of all cells in the grid. For the next order Hilbert curve, each quadrant is again subdivided into four sub-quadrants and the rotating ⌐ shape is used to describe the curve in these quadrants. Algorithmic details about how a Hilbert curve of order d can be constructed efficiently can be found, for example, in A. R. Butz. *Alternative Algorithms for Hilbert's Space-Filling Curve*. IEEE Transactions on Computers, pages 424-426, April 1971; J. K. Lawder. *The Application of Space-Filling Curves to the Storage and Retrieval of Multidimensional Data*. PhD thesis, Birbeck College, University of London, 2000; and H. Sagan. *Space-Filling Curves*. Springer, 1994, the contents of each of the foregoing are fully incorporated by reference.

The curve obtained in this way visits every cell in the grid once, and it provides an enumeration of the cells, as indicated by the numbers in each cell in diagram 400 of FIG. 4. In general, a Hilbert curve of order d in 2-dimensional space passes through $2^{2d}$ quadrants. The maximum length of a Hilbert curve of order d, denoted $l_d$ then is $2^{2d}-1$, starting with the value 0. These properties of a Hilbert curve make clear that a linearization of space partitions, here a sequence of quadrants, is obtained.

Now, for every point p located in the grid, its Hilbert distance, denoted hd(p) can be given. Different techniques for computing the Hilbert distance using recursion or iteration (preferred) over bit representations of the point data and cell coordinates can be utilized such as those described in, for example, J. K. Lawder. *Calculation of mappings between one and n-dimensional values using the Hilbert space-filling curve*. Technical Report JL1/00, School of Computer Science and Information Systems, University of London, August 2000; and H. Sagan. *Space-Filling Curves*. Springer, 1994; the contents of both the foregoing are incorporated by reference herein. For example, any point in the lower left quadrant in the right curve in diagram 400 of FIG. 4 would have the Hilbert distance 0, and any point in the lower right quadrant would have the distance $2^{2*2}-1=15$.

Based on the concepts of Hilbert curve and Hilbert distance, the following describes how a set $P=\{p_1, p_2, \ldots, p_n\}$ of n points in 2-dimensional space is mapped to a column-store. The approach proceeds in three steps.

Step 1: Point Shifting and Base Quadrant.

In the first step, if there are points with negative coordinates in P, all points can be transformed into a positive coordinate space. The reason for doing this shifting is simply to avoid dealing with and storing negative coordinate values in a column store. For this, the minimum negative x- and y-coordinates, $x_{min}$ and $y_{min}$, respectively, are determined. All point coordinates can be shifted by these two values to obtain a positive coordinate domain $\mathbb{R}^2$. This shifting is not physically applied to the input point data, but the shift values are memorized and used in later mappings. The shifted point set is continued to be referenced as P.

While determining the shift values, also the spatial extent of the point set is determined, resulting in two axes-lengths $extent_x=[x_{min}, x_{max}]$ and $extent_y=[y_{min}, y_{max}]$. Because underlying a Hilbert curve is a square covering all points, the maximum axis length, denoted l, is chosen as the base side for the quadrant. Conceptually, the coordinates along the axes are then determined as follows: The lower left corner of the quadrant has the coordinates $(x_{min}, y_{min})$, and, if $extent_x \geq extent_y$, then the upper right corner has the coordinates $(x_{max}, y_{min}+extent_x)$, otherwise it has the coordinates $(x_{min}+extent_y, y_{max})$. This view of the points in the initial quadrant now provides us with the basis for the next step.

Step 2: Determining the Hilbert Order.

Now the order of the Hilbert curve for the (shifted) point set P can be determined, given the spatial extent of the initial quadrant. A good order for a curve for P has the property that (1) for most points, if two points are in spatial proximity, then they also should have a similar (not identical) Hilbert distance, and (2) ideally, no two points should have the same Hilbert distance (unless they have exactly the same coordinates). Clearly, if the order is too low, in case of a cluster of points, most of these points will have the same Hilbert distance, resulting in poor selectivity. On the other hand, if the order is chosen to high, for a less dense populated region, nearby points might have Hilbert distances that are far apart. Considering the computational complexity it also is advantageous to have a Hilbert curve of a low order because (1) the computation of Hilbert distances is linear in the order of the order d of the curve, and (2) storing large values of Hilbert distances requires more memory.

To address this problem of finding a good order, one can employ some simple heuristics. Given the maximum Hilbert distance $l_d$ for a some order d. One then could compute the ratio $l_d/n$, with n being the number of points in P. The closer the ratio to 1, the more likely it is that the points have different Hilbert distances. This approach, however, only works well if points are equally distributed in space, a property that is expensive to determine beforehand. One could also compute the ratio of the maximum axis length l (see Step 1) and ($l_d$/n), indicating the density of points along an axis, and use some threshold to determine an order d. In any event, all such heuristics are prone to obtaining an order that fails to suitably consider different point distributions. To deal with the problem, in this Step 2, once can simply assume a relatively low order and then continue with Step 3 below based on that order. Described below is an approach that, without applying heuristics, immediately gives us an order guaranteeing that all points in P have a different Hilbert distance, a key property of our approach.

Step 3: Point Mapping.

Given a Hilbert curve of order d with its spatial extent and a (shifted) point set P.

The following illustrates how respective dictionary structures and bit compressed vectors can be constructed from P.

First, using temporary structures Temp and Temp2, the point set P is sorted based on the Hilbert distance hd computed for each point. From Temp2 a dictionary $D_{hd}$ is created in which the Hilbert distances are listed in increasing order. The two dictionaries $D_x$ and $D_y$ encode the coordinate values of the points and thus provide value IDs for the x and y-coordinates; these dictionaries can also be used later to materialize point coordinates for answering spatial queries. In the bit compressed vectors the value IDs of respective points are listed, following the same sort order as in Temp2 and $D_{hd}$, respectively. Thus, the first entries in $I_x$ and $I_y$ contain the value IDs of the coordinates of the point p∈P that has the smallest Hilbert distance.

Assume Hilbert curve of order 4 for our point set P. The locations of the shifted points are shown in diagram 500 of FIG. 5.

Table 1 shows the resulting dictionaries ($D_x$ and $D_y$ with value IDs for encoded coordinate values) and the two bit compressed vectors for the axes. For example, the shifted point $p_t$ (13.3, 6.5) (originally with coordinates (14.3, 7.5)) with Hilbert distance 205 is represented as the sixth entry in $I_x$ and $I_y$.

TABLE 1

Dictionary $D_{hd}$, bit compressed vectors $I_x$; $I_y$, and dictionary encodings $D_x$; $D_y$, for shifted points set P

|  |  |  | $D_x$ |  | $D_y$ |  |
|---|---|---|---|---|---|---|
| $D_{hd}$ | $I_x$ | $I_y$ | x | Val.ID | y | Val.ID |
| 0 | 1 | 0 |  |  |  |  |
| 83 | 0 | 6 | 0.0 | 0 | 0.0 | 0 |
| 181 | 4 | 5 | 0.1 | 1 | 4.1 | 1 |
| 192 | 6 | 4 | 9.0 | 2 | 4.5 | 2 |
| 201 | 5 | 1 | 9.4 | 3 | 6.5 | 3 |
| 205 | 5 | 3 | 12.5 | 4 | 7.0 | 4 |
| 219 | 3 | 2 | 13.3 | 5 | 11.2 | 5 |
| 219 | 2 | 2 | 15.0 | 6 | 13.5 | 6 |

An ideal Hilbert curve for a given point set should be of a minimal order such that (1) no two points have the same Hilbert distance, and (2) there are no gaps between distances. This requirement, however, cannot be achieved using traditional techniques for Hilbert curves, such as the heuristics presented in Step 2 above. Consider the location of the points in the Hilbert curve of order 4 in diagram 400 of FIG. 4. The majority of the points are located in the fourth initial quadrant, and only because of the points $p_1$, $p_3$, and $p_4$ the spatial extent of the Hilbert curve is quadrupled, leading to large gaps in the Hilbert distances (0, 83, 181). Furthermore, the points $p_2$ and $p_5$ have the same Hilbert distance 219 even though they have different locations.

In the context of using Hilbert distances in column-stores, however, we have more options for efficient encodings. The idea is to transform the location of all points in a way such that no two points have the same location and there are no large gaps in Hilbert distances for the resulting point set. Such a transformation f should have the following properties for every pair of points $p_i(x_i, y_i)$ and $p_j(x_j, y_j)$, $p_i, p_j \in P: x_i < x_j \Rightarrow f(x_i) < f(x_j)$ and $y_i < y_j \Rightarrow < f(y_j)$. That is, the transformation should be order preserving on all axes. Furthermore, f should be isomorphic so that it can be applied independently to the axes such that containment relationships of axis-parallel rectangles are preserved.

Such a transformation can be obtained based on the following observation. Any dictionary encoding can be viewed as a strictly monotonically increasing function that maps values of the value domain to value IDs in $\mathbb{N}_0$. Thus, it is a valid transformation with the desired properties described above. Once can apply this property for obtaining an optimal order for a Hilbert curve and distance encoding as follows.

Consider the dictionary $D_x$ in Table 1. Instead of using the original point coordinates or distance values, one can determine the order of a Hilbert curve simply based on the number of value IDs in that dictionary. Thus, a minimal order must not be calculated explicitly anymore (as done in Step 2) but can be directly derived from the axis dictionaries. The order of the Hilbert curve is then equal to the number of bits necessary to represent all the value IDs in the dictionary.

More precisely, let $d = \lceil \log_2 \max \{|D_x|,|D_y|\} \rceil$. For the dictionaries for our sample point set we thus get $\lceil \log_2(7) \rceil = 3$. Thereafter, the Hilbert curve can be represented as shown in diagram 500 of FIG. 5. In this arrangement, each of the two axes now have to have the spatial extent $2^d - 1$, with the range from $0, \ldots, 2^d - 1$. The positioning of the points is based on the value IDs encoded in $D_x$ and $D_y$, respectively.

Figure 5:
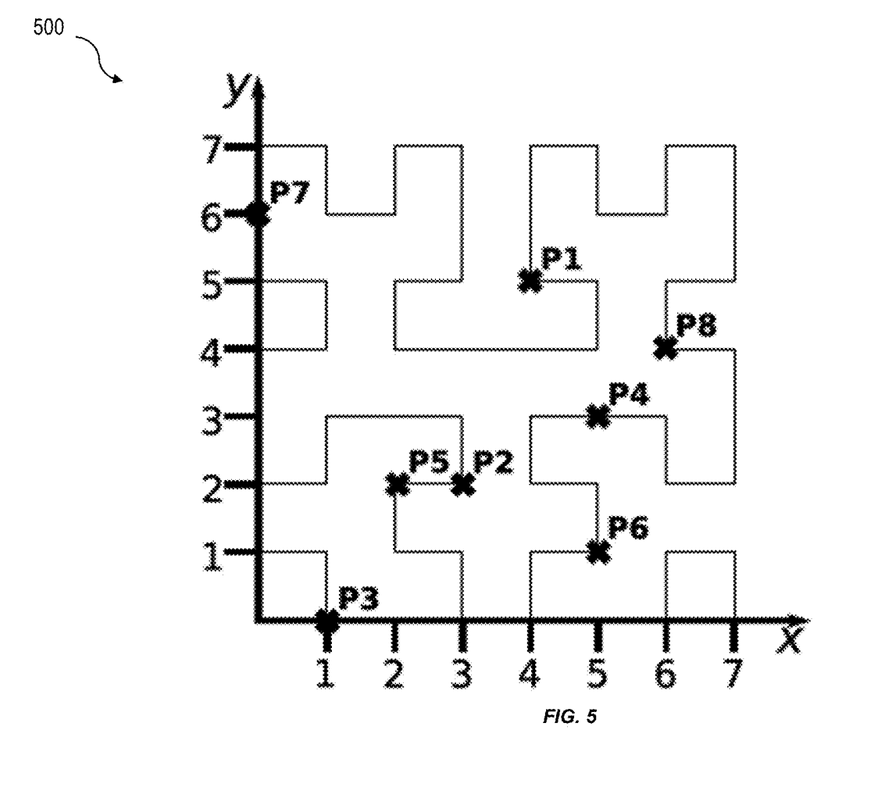
FIG. 5 is a second diagram illustrating spatial data in relation to a space-filling curve.

For example, the point $p_4$ with coordinates (13.3, 6.5) now has the position (5,3), as the value 13.3 is at position 5 in $D_x$ and the value 6.5 at position 3 in Dy. It is clear that through this type of transformation no two points have the same Hilbert distance. Technically, for the shifted point set P, first the dictionary encodings $D_x$ and $D_y$ are constructed. From the maximum number of entries in $D_x$ and $D_y$ the order d is determined. Based on that order, the Hilbert distance for each point is computed and recorded in a sorted order in $D_{hd}$ (as shown in the algorithm below). It is important to note that for computing the distance, the value IDs of the coordinates are used and not the coordinates. The bit compressed vectors for the points are then constructed from that order using the value IDs in $D_x$ and $D_y$.

```
Input: Point set P, order d
    Temp ← ∅ {Table with three columns px, py, hd}
    for all p ∈ P do
        Temp ← Temp ∪ (p.x, p.y, hd(p)) { Add points with
            their Hilbert distance}
    end for
    Temp2 ← sort Temp based on column hd
    D_x ← Dictionary encode Temp2.px
    D_y ← Dictionary encode Temp2.py
    D_hd ← π(Temp2) {Build single column of Hilbert dis-
        tances}
    Using value IDs in D_x, create Index Vector I_x
    Using value IDS in D_y, create Index Vector I_y
ALGORITHM
```

To summarize, the above approach leads to a Hilbert curve of minimal order such that no two points have the same Hilbert distance. The structures obtained this way can now be used to efficiently process spatial queries.

Dictionary structures and bit compressed vectors can be computed efficiently even for large point sets. Once the dictionary encoding for the shifted point set P has been completed and the order has been determined, the Hilbert distances of the points can be computed. This can be done efficiently in parallel by constructing Temp (see the Algorithm above). The most expensive steps are the sorting of the resulting structure Temp based the Hilbert distance and the creation of the bit compressed vectors $I_x$ and $I_y$.

It should be noted that the approaches described above do not consider updates to an existing point set and Hilbert curve. For adding points, increasing the spatial extent of the curve or increasing the number of different coordinate values may require that a new curve needs to be constructed. That is why in this case, during a delta merge, a new mapping is computed from scratch using the previous point set and the point set to be merged. Although in case of deletions, deleted points can be marked (in the bit compressed vectors), a deletion of many points might lead to a decrease of the order of the Hilbert curve. That is why in the current approach, also in this case the curve is constructed from scratch.

The following describes how point and window queries can be processed against a column-store constructed using the Hilbert mapping described above. One can assume that dictionary structures and bit compressed vectors Dhd, Dx, Dy and Ix, Iy, respectively, have been constructed based on a Hilbert curve of order d.

Figure 6:
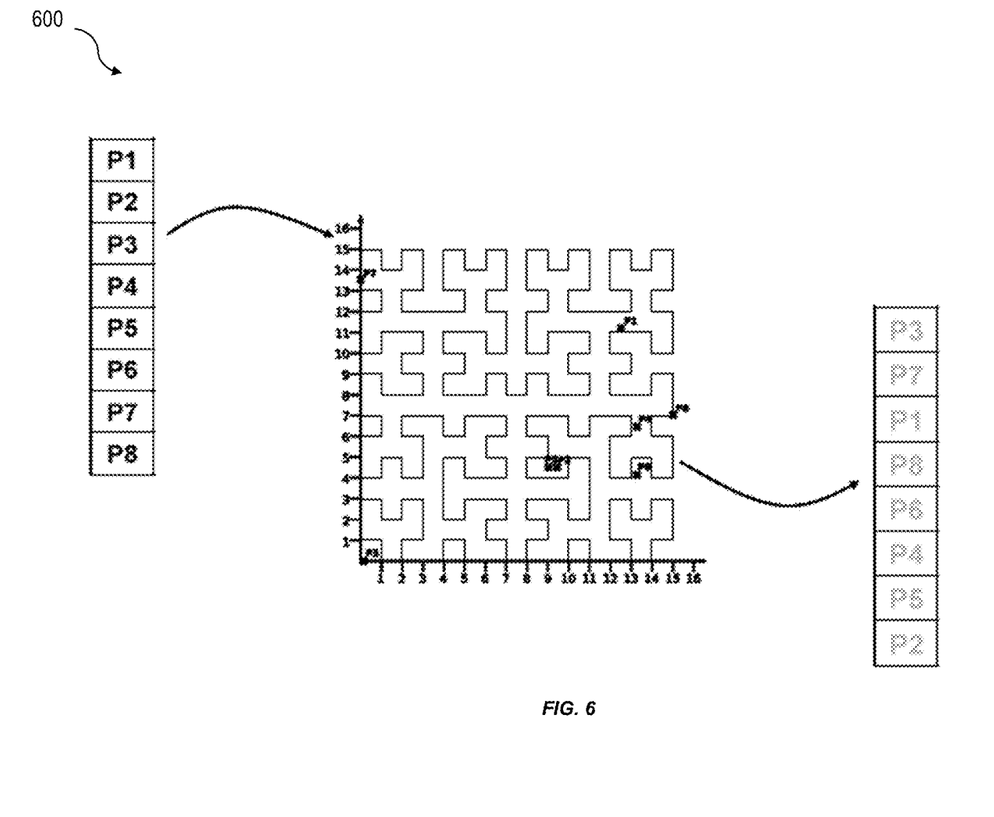
FIG. 6 is a diagram illustrating mapping of spatial data to physical storage.

For point queries and with reference to diagram 600 of FIG. 6, a non-compactified representation is shown. To determine whether a query point p(x, y) exists in a point set P, in the best case, there is no access to the bit compressed vectors necessary when the dictionary $D_{hd}$ is available. For the point p, the shift values are applied and its Hilbert distance hd(p) is computed. If that distance cannot be found in $D_{hd}$ (using a binary search), then $p \notin P$.

If the Hilbert distance is found in $D_{hd}$ (note that it can appear there more than once in the non-compactified version), respective positions in the bit compressed vectors $I_x$ and $I_y$ are scanned, the obtained value IDs are materialized to the x and y coordinates using $D_x$ and $D_y$, and the coordinates thus obtained for each point are compared to those ofp. Note that even if the Hilbert distance for p is found in $D_{hd}$, for the non-compactified version of the mapping, the point having that distance must not necessarily have the same coordinates as p. This simple case already makes clear the advantage of Hilbert mapping, because there is no need for a full scan of any bit compressed vector, as required by naive mapping 4. That is, the Hilbert mapping ensures a much better memory locality of the point data.

In case of the compactified version, the dictionaries can be looked up in parallel for the valued IDs of the coordinates of p. If a value does not exist in either $D_x$ or $D_y$, $p \in P$. Otherwise, the two value IDs are used to compute p's Hilbert distance, which then is looked up in $D_{hd}$, again using a binary search. If it can be found, then due to the uniqueness of the distances in $D_{hd}$ it is known that $p \notin P$.

Figure 7:
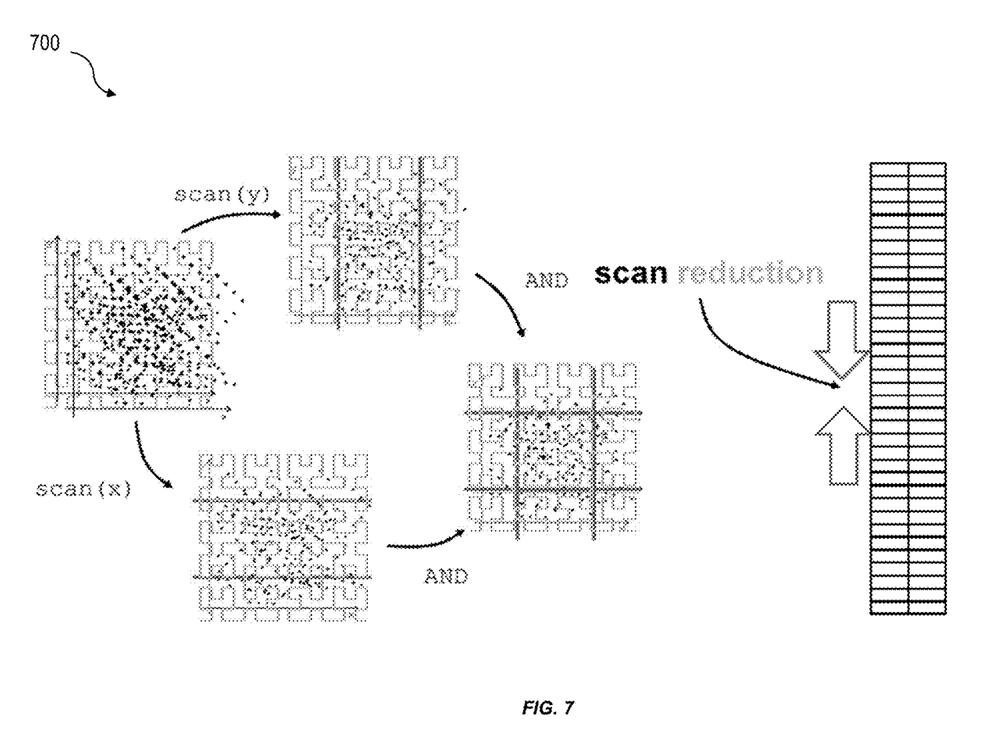
FIG. 7 is a diagram illustrating axial scans combined with scan reduction techniques.
Figure 8:
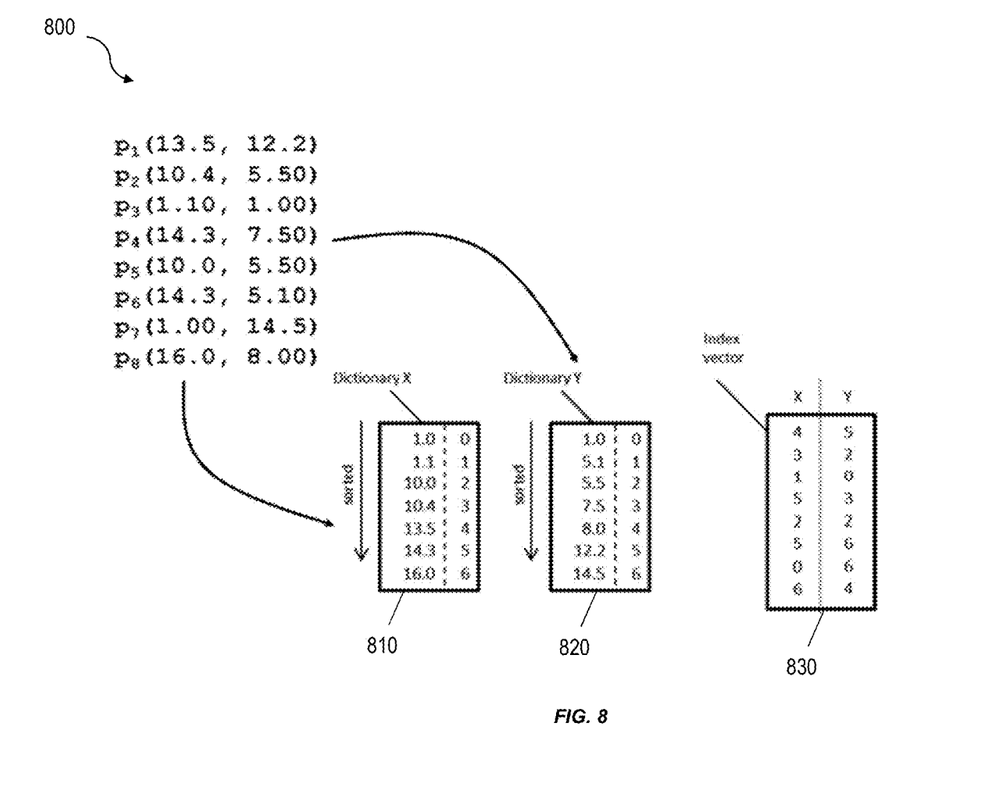
FIG. 8 is a diagram illustrating axial data dictionaries and a corresponding bit compressed vector.

With reference to diagram 700 of FIG. 7, analogously to window queries, an axis parallel, rectangular query window, specified by the lower left and upper right corner points $p(x_l, y_l)$ and upper right point $p(x_u, y_u)$, respectively, can be provided. One can consider how the non-compactified mapping is used to answer such type of query. Using the compactified version of our Hilbert mapping approach works similarly. Thereafter, with regard to diagram 800 of FIG. 8, dictionaries 810, 820, can be generated for each axis as well as an bit compressed vector 830.

Figure 9:
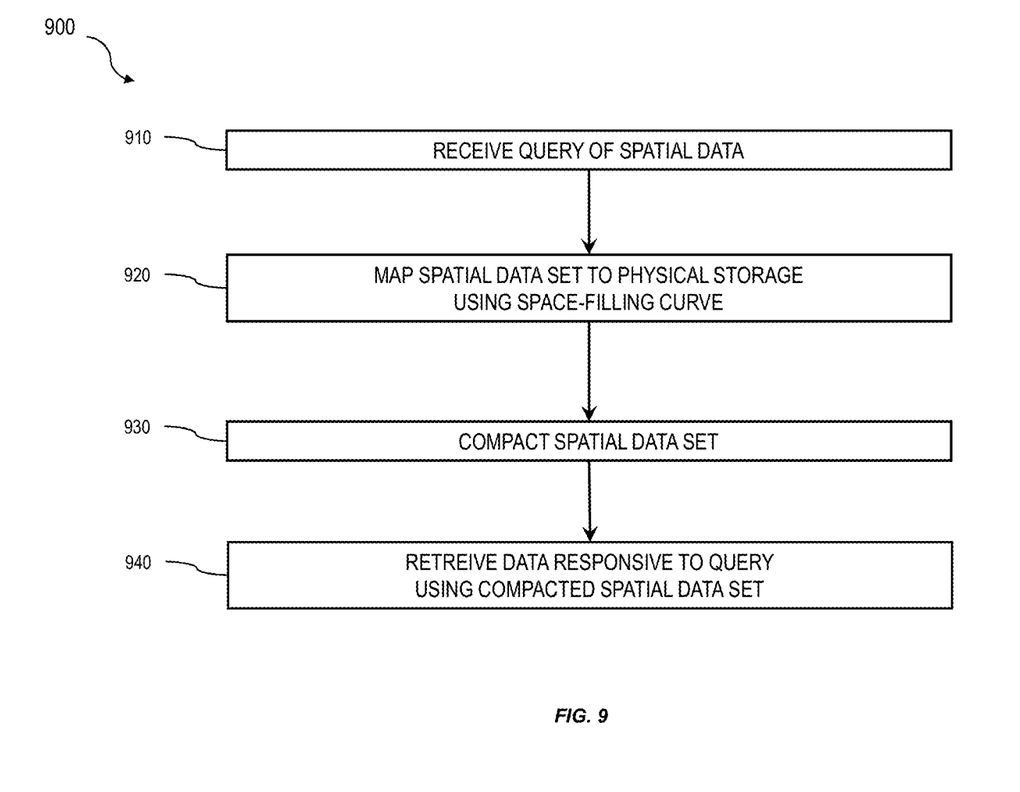
FIG. 9 is a process flow diagram illustrating handling of spatial data queries using space-filling curves.

FIG. 9 is a process flow diagram of method 900 in which, at 910, a database receives a query of spatial data. The database includes a columnar data store storing data in a column-oriented structure, a query of spatial data. Thereafter, at 920, a spatial data set corresponding/associated with the received query is mapped to physical storage in the database using a space-filling curve (e.g., a Hilbert curve, etc.). The spatial data set is, at 930, then compacted so that, at 940, data can be retrieved, using the compacted spatial data set, from the database responsive to the query.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving, at a database comprising a columnar data store storing data in a column-oriented structure, a query on a spatial data set occupying a multi-dimensional space;
   mapping, by at least one data processor, the spatial data set to physical storage in the database, the spatial data set having a plurality of coordinate values that are encoded using a corresponding plurality of value identifiers, the mapping using a space-filling curve having a minimal order such that the space-filling curve traverses every cell in a grid divided into a minimum quantity of cells, the minimal order of the space-filling curve being determined based at least on a quantity of the plurality of value identifiers used to encode the plurality of coordinate values, the mapping of the spatial data set using the space-filling curve having the minimal order transforming the spatial data set from the multi-dimensional space to a one-dimensional space along the space-filling curve, and the spatial data set being mapped using the space-filling curve having the minimal order such that no two points in the spatial data set are mapped to a same distance on the space-filling curve;
   compacting, by the at least one data processor, the spatial data set based at least on the mapping of the spatial data set using the space-filling curve having the minimal order; and
   executing, by the at least one data processor, the query by at least retrieving, from the database, at least a portion of the compacted spatial data set responsive to the query.

2. The method as in claim 1, wherein the space-filling curve comprises a Hilbert curve.

3. The method as in claim 2, wherein the mapping comprises:
   transforming, by at least one data processor, points in the spatial data set into a positive coordinate space; and
   defining, by at least one data processor, a quadrant based on boundaries of the transformed points.

4. The method as in claim 3, wherein the mapping further comprises:
   determining, by the least one data processor, the minimal order for the Hilbert curve.

5. The method as in claim 1, wherein the minimal order further provides that points in the spatial data set have different respective distances on the space-filling curve, and wherein the respective distances vary based at least on a relative spatial proximity between the points in the spatial data set.

6. The method as in claim 1, wherein the mapping further comprises:
   sorting, by the at least one data processor, the points in the spatial data set, the points in the spatial data set being sorted according to a respective distance on the space-filling curve.

7. The method as in claim 6, wherein the mapping further comprises:
   generating, by the at least one data processor, a data dictionary and a corresponding bit compressed vector for each axis of the spatial data set.

8. The method as in claim 1, wherein the spatial data set is compressed such that no two points in the spatial data set have a same distance on the space-filling curve.

9. The method as in claim 1, wherein the using of the space-filling curve having the minimal order prevents gaps between points mapped to the space-filling curve.

10. The method as in claim 1, wherein the space-filling curve comprises a Z-curve or a Moore curve.

11. The method as in claim 1, wherein the minimal order corresponds to a number of bits required to represent every one of the plurality of value identifiers.

12. A non-transitory computer program product storing instructions which, when executed by at data processor of at least one computing system, result in operations comprising:
   receiving, at a database comprising a columnar data store storing data in a column-oriented structure, a query on a spatial data set occupying a multi-dimensional space;
   mapping, by at least one data processor, the spatial data set to physical storage in the database, the spatial data set having a plurality of coordinate values that are encoded using a corresponding plurality of value identifiers, the mapping using a space-filling curve having a minimal order such that the space-filling curve traverses every cell in a grid divided into a minimum quantity of cells, the minimal order of the space-filling curve being determined based at least on a quantity of the plurality of value identifiers used to encode the plurality of coordinate values, the mapping of the spatial data set using the space-filling curve having the minimal order transforming the spatial data set from the multi-dimensional space to a one-dimensional space along the space-filling curve, and the spatial data set being mapped using the space-filling curve having the minimal order such that no two points in the spatial data set are mapped to a same distance on the space-filling curve;

compacting, by the at least one data processor, the spatial data set based at least on the mapping of the spatial data set using the space-filling curve having the minimal order; and executing, by the at least one data processor, the query by at least retrieving, from the database, at least a portion of the compacted spatial data set responsive to the query.

13. The computer program product as in claim 12, wherein the space-filling curve comprises a Hilbert curve.

14. The computer program product as in claim 13, wherein the mapping comprises:
transforming points in the spatial data set into a positive coordinate space; and
defining a quadrant based on boundaries of the transformed points.

15. The computer program product as in claim 14, wherein the mapping further comprises:
determining the minimal order for the Hilbert curve.

16. The computer program product as in claim 12, wherein the minimal order further provides that points in the spatial data set have different respective distances on the space-filling curve, and wherein the respective distances vary based at least on a relative spatial proximity between the points in the spatial data se.

17. The computer program product as in claim 12, wherein the mapping further comprises:
sorting the points in the spatial data set, the points in the spatial data set being sorted according to respective distances of the points on the space-filling curve.

18. The computer program product as in claim 17, wherein the mapping further comprises:
generating a data dictionary and a corresponding bit compressed vector for each axis of the spatial data set.

19. The computer program product as in claim 12, wherein the using of the space-filling curve having the minimal order prevents gaps between points mapped to the space-filling curve.

20. The computer program product as in claim 12, wherein the space-filling curve comprises a Z-curve or a Moore curve.

21. A system comprising:
computer hardware comprising at least one data processor; and
a database comprising a columnar data store storing data in a column-oriented structure;
wherein the computer hardware performs database operations comprising:
receiving a query on a spatial data set occupying a multi-dimensional space;
mapping the spatial data set to physical storage in the database, the spatial data set having a plurality of coordinate values that are encoded using a corresponding plurality of value identifiers, the mapping using a space-filling curve having a minimal order such that the space-filling curve traverses every cell in a grid divided into a minimum quantity of cells, the minimal order of the space-filling curve being determined based at least on a quantity of the plurality of value identifiers used to encode the plurality of coordinate values, the mapping of the spatial data set using the space-filling curve having the minimal order transforming the spatial data set from the multi-dimensional space to a one-dimensional space along the space-filling curve, and the spatial data set being mapped using the space-filling curve having the minimal order such that no two points in the spatial data set are mapped to a same distance on the space-filling curve;
compacting the spatial data set based at least on the mapping of the spatial data set using the space-filling curve having the minimal order; and
executing the query by at least retrieving from the database, at least a portion of the compacted spatial data set responsive to the query.

* * * * *